US009151834B2

(12) United States Patent
Hyde et al.

(10) Patent No.: US 9,151,834 B2
(45) Date of Patent: Oct. 6, 2015

(54) NETWORK AND PERSONAL ELECTRONIC DEVICES OPERATIVELY COUPLED TO MICRO-IMPULSE RADARS

(75) Inventors: Roderick A. Hyde, Redmond, WA (US); Jordin T. Kare, Seattle, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 923 days.

(21) Appl. No.: 13/068,051

(22) Filed: Apr. 29, 2011

(65) Prior Publication Data

US 2012/0274503 A1 Nov. 1, 2012

(51) Int. Cl.
| | |
|---|---|
| G01S 13/00 | (2006.01) |
| G01S 13/56 | (2006.01) |
| G01S 7/41 | (2006.01) |
| G01S 13/88 | (2006.01) |
| G01S 13/89 | (2006.01) |
| G01S 7/00 | (2006.01) |

(52) U.S. Cl.
CPC ............... *G01S 13/56* (2013.01); *G01S 7/412* (2013.01); *G01S 13/887* (2013.01); *G01S 13/89* (2013.01); *G01S 7/003* (2013.01)

(58) Field of Classification Search
CPC ......... G01S 13/86; G01S 7/003; G01S 13/88; G01S 7/412
USPC .......................................................... 342/175
See application file for complete search history.

(56) References Cited

U.S. PATENT DOCUMENTS

| | | | |
|---|---|---|---|
| 4,513,748 A | 4/1985 | Nowogrodzki et al. | |
| 4,958,638 A | 9/1990 | Sharpe et al. | |
| 5,361,070 A | 11/1994 | McEwan | |
| 5,507,291 A | 4/1996 | Stirbl et al. | |
| 5,519,400 A | 5/1996 | McEwan | |
| 5,544,661 A | 8/1996 | Davis et al. | |
| 5,579,001 A | 11/1996 | Dempsey et al. | |
| 6,031,454 A | 2/2000 | Lovejoy et al. | |
| 6,062,216 A | 5/2000 | Corn | |
| 6,122,537 A | 9/2000 | Schmidt | |
| 6,132,371 A | 10/2000 | Dempsey et al. | |
| 6,295,506 B1 | 9/2001 | Heinonen et al. | |
| 6,315,719 B1 | 11/2001 | Rode et al. | |
| 6,396,416 B1 | 5/2002 | Kuusela et al. | |
| 6,417,797 B1 | 7/2002 | Cousins et al. | |
| 6,454,708 B1 | 9/2002 | Ferguson et al. | |
| 6,456,231 B1 * | 9/2002 | McEwan ........................ | 342/93 |
| 6,466,125 B1 | 10/2002 | Richards et al. | |
| 6,535,161 B1 * | 3/2003 | McEwan ....................... | 342/124 |
| 6,544,174 B2 | 4/2003 | West et al. | |

(Continued)

FOREIGN PATENT DOCUMENTS

WO WO 2008/001092 A2 1/2008

OTHER PUBLICATIONS

Citation for Michahelles et al.; Published at the Eighth International Symposium on Wearable Computers; Oct. 31-Nov. 3, 2004; pp. 4-7, retrieved on Jul. 18, 2012 from the internet at http://ieeexplore.ieee.org/xpls/abs_all.jsp?arnumber=1364682&isnumber=29895&tag=1.

(Continued)

*Primary Examiner* — Timothy A Brainard (57) ABSTRACT

A network resource can be operatively coupled to personal electronic devices that include or are operatively coupled to micro-impulse radars (MIRs).

36 Claims, 7 Drawing Sheets

(56) References Cited

U.S. PATENT DOCUMENTS

| | | |
|---|---|---|
| 6,611,783 B2 | 8/2003 | Kelly, Jr. et al. |
| 6,696,957 B2 | 2/2004 | Shepher |
| 7,001,334 B2 | 2/2006 | Reed et al. |
| 7,106,885 B2 | 9/2006 | Osterweil et al. |
| 7,440,779 B2 * | 10/2008 | Kim et al. .................. 455/569.1 |
| 7,567,200 B1 | 7/2009 | Osterweil |
| 7,650,144 B2 | 1/2010 | Nakamura et al. |
| 7,753,849 B2 | 7/2010 | Morgan et al. |
| 7,898,455 B2 | 3/2011 | Rosenbury |
| 7,916,066 B1 | 3/2011 | Osterweil |
| 8,052,600 B2 | 11/2011 | Beck et al. |
| 8,454,528 B2 | 6/2013 | Yuen et al. |
| 2002/0021231 A1 | 2/2002 | Schlager et al. |
| 2002/0120184 A1 | 8/2002 | Beck et al. |
| 2002/0198632 A1 * | 12/2002 | Breed et al. ........................ 701/1 |
| 2003/0135097 A1 | 7/2003 | Wiederhold et al. |
| 2003/0160701 A1 | 8/2003 | Nakamura et al. |
| 2004/0027270 A1 | 2/2004 | Fullerton et al. |
| 2004/0133081 A1 | 7/2004 | Teller et al. |
| 2004/0249258 A1 | 12/2004 | Tupin, Jr. et al. |
| 2005/0040230 A1 | 2/2005 | Swartz et al. |
| 2005/0046569 A1 | 3/2005 | Spriggs et al. |
| 2005/0046584 A1 | 3/2005 | Breed |
| 2005/0195101 A1 | 9/2005 | Stevens et al. |
| 2005/0242984 A1 | 11/2005 | Waters |
| 2006/0001545 A1 | 1/2006 | Wolf |
| 2006/0061504 A1 | 3/2006 | Leach, Jr. et al. |
| 2006/0119473 A1 * | 6/2006 | Gunderson et al. ........... 340/435 |
| 2006/0195050 A1 | 8/2006 | Alwan et al. |
| 2006/0239471 A1 | 10/2006 | Mao et al. |
| 2006/0253598 A1 | 11/2006 | Nakamura et al. |
| 2007/0030115 A1 | 2/2007 | Itsuji et al. |
| 2007/0030156 A1 | 2/2007 | Schlager et al. |
| 2007/0100666 A1 | 5/2007 | Stivoric et al. |
| 2007/0176821 A1 | 8/2007 | Flom et al. |
| 2007/0197881 A1 | 8/2007 | Wolf et al. |
| 2008/0007445 A1 * | 1/2008 | Leach et al. ..................... 342/21 |
| 2008/0064413 A1 | 3/2008 | Breed |
| 2008/0071467 A1 * | 3/2008 | Johnson et al. ............... 701/118 |
| 2008/0082018 A1 | 4/2008 | Sackner et al. |
| 2008/0088462 A1 | 4/2008 | Breed |
| 2008/0101329 A1 | 5/2008 | Richards et al. |
| 2008/0108372 A1 | 5/2008 | Breed |
| 2008/0117094 A1 | 5/2008 | Lindoff et al. |
| 2008/0119716 A1 | 5/2008 | Boric-Lubecke et al. |
| 2008/0167535 A1 | 7/2008 | Stivoric et al. |
| 2008/0171922 A1 | 7/2008 | Teller et al. |
| 2008/0238757 A1 | 10/2008 | Lin et al. |
| 2008/0270172 A1 | 10/2008 | Luff et al. |
| 2008/0275309 A1 | 11/2008 | Stivoric et al. |
| 2008/0275349 A1 | 11/2008 | Halperin et al. |
| 2008/0287751 A1 | 11/2008 | Stivoric et al. |
| 2008/0287817 A1 | 11/2008 | Stivoric et al. |
| 2008/0311882 A1 | 12/2008 | Schlager et al. |
| 2009/0017910 A1 | 1/2009 | Rofougaran et al. |
| 2009/0052859 A1 | 2/2009 | Greenberger et al. |
| 2009/0058711 A1 | 3/2009 | Dixon et al. |
| 2009/0138805 A1 | 5/2009 | Hildreth |
| 2009/0177068 A1 | 7/2009 | Stivoric et al. |
| 2009/0215488 A1 * | 8/2009 | Causey et al. .............. 455/556.1 |
| 2010/0026550 A1 | 2/2010 | Rosenbury |
| 2010/0130873 A1 | 5/2010 | Yuen et al. |
| 2010/0141443 A1 | 6/2010 | Romero et al. |
| 2010/0198083 A1 | 8/2010 | Lin et al. |
| 2010/0214149 A1 * | 8/2010 | Kuhn ............................. 342/20 |
| 2010/0240999 A1 | 9/2010 | Droitcour et al. |
| 2010/0286532 A1 | 11/2010 | Farringdon et al. |
| 2010/0306388 A1 | 12/2010 | Newville |
| 2011/0161136 A1 | 6/2011 | Faith et al. |
| 2011/0166940 A1 | 7/2011 | Bangera et al. |
| 2011/0237274 A1 | 9/2011 | Wong et al. |
| 2011/0285579 A1 | 11/2011 | Bangera et al. |
| 2012/0068876 A1 | 3/2012 | Bangera et al. |
| 2012/0116202 A1 | 5/2012 | Bangera et al. |
| 2012/0229304 A1 * | 9/2012 | Dalal ............................ 340/936 |

OTHER PUBLICATIONS

Michahelles et al.; "Less Contact: Heart-Rate Detection Without Even Touching The User"; Eighth International Symposium on Wearable Computers; bearing a date of 2004; pp. 1-4; vol. 1; located at http://72.52.208.92/~gbpprorg/mil/cavity/iswc04_radar.pdf.

PCT International Search Report; International App. No. PCT/US12/35386; Aug. 13, 2012; pp. 1-3.

European Patent Office, Supplementary European Search Report, Pursuant to Rule 62 EPC; App. No. EP 12777396.8; Sep. 26, 2014 (received by our Agent on Sep. 30, 2014); pp. 1-8.

* cited by examiner

NETWORK AND PERSONAL ELECTRONIC DEVICES OPERATIVELY COUPLED TO MICRO-IMPULSE RADARS

CROSS-REFERENCE TO RELATED APPLICATIONS

The present application is related to and, if appropriate, claims the benefit of the earliest available effective filing date(s) from the following listed application(s) (the "Related Applications") (e.g., claims earliest available priority dates for other than provisional patent applications or claims benefits under 35 USC§119(e) for provisional patent applications, for any and all parent, grandparent, great-grandparent, etc. applications of the Related Application(s)).

RELATED APPLICATIONS

For purposes of the USPTO extra-statutory requirements, the present application is related to the following U.S. patent applications:

Application Ser. No. 13/068,049, entitled PERSONAL ELECTRONIC DEVICE WITH A MICRO-IMPULSE RADAR, naming Roderick A. Hyde, Jordin T. Kare, and Lowell L. Wood, Jr. as inventors, filed Apr. 29, 2011.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

According to an embodiment, a system can include a network resource configured to receive micro-impulse radar data from one or more personal electronic devices and a communications circuit configured to operatively couple one or more personal electronic devices to the network resource. Each personal electronic device can be operatively coupled to at least one micro-impulse radar (MIR), and each personal electronic device can be configured to transmit MIR data from the MIR to the network resource.

According to an embodiment, a method for determining an environment of a personal electronic device can include receiving MIR data from one or more personal electronic devices and storing or transmitting second data corresponding to the received MIR data.

According to an embodiment, a non-transitory computer-readable medium can carry computer instructions configured to cause a network resource to receive MIR radar data from one or more personal electronic devices and store or transmit second data corresponding to the received MIR data.

According to an embodiment, a method can include operating a MIR operatively coupled to a personal electronic device to produce MIR data and storing or transmitting second data corresponding to the produced MIR data.

According to an embodiment, a non-transitory computer-readable medium can carry computer instructions configured to cause a personal electronic device to operate a MIR operatively coupled to the personal electronic device to produce MIR data and store or transmit second data corresponding to the produced MIR data.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments can be utilized, and other changes can be made, without departing from the spirit or scope of the subject matter presented here.

Figure 1:
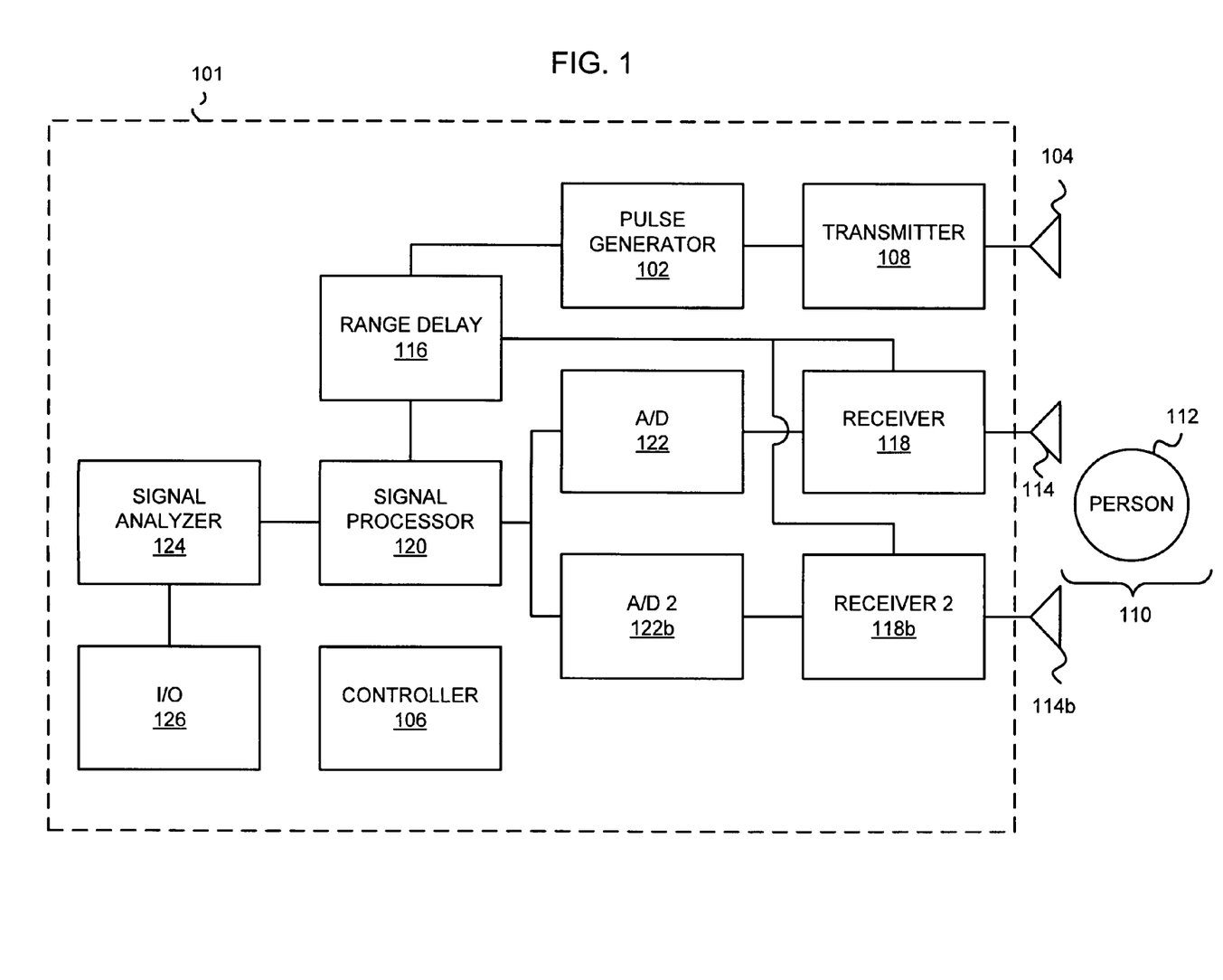
FIG. 1 is a simplified block diagram of a micro-impulse radar (MIR), according to an embodiment.

FIG. 1 is a simplified block diagram of a micro-impulse radar (MIR) 101, according to an embodiment. A pulse generator 102 is configured to output a relatively short voltage pulse that is applied to a transmit antenna 104. A typical transmitted pulse width can be between about two hundred picoseconds and about 5 nanoseconds, for example. The voltage pulse can be conditioned and amplified (or attenuated) for output by a transmitter 108. For example, the transmitter 108 can transmit the voltage pulse or can further condition the pulse, such as by differentiating a leading and/or trailing edge to produce a short sub-nanosecond transmitted pulses. The voltage pulse is typically not modulated onto a carrier frequency. Rather, the voltage pulse transmission spectrum is the frequency domain transform of the emitted pulse. The MIR 101 can probe a region 110 by emitting a series of spaced voltage pulses. For example, the series of voltage pulses can be spaced between about 100 nanoseconds and 100 microseconds apart. Typically, the pulse generator 102 emits the voltage pulses with non-uniform spacing such as random or pseudo-random spacing, although constant spacing can be used if interference or compliance is not a concern. Spacing between the series of voltage pulses can be varied responsive to detection of one or more persons 112 in the region 110. For example, the spacing between pulses can be relatively large when a person 112 is not detected in the region 110. Spacing between pulses can be decreased (responsive to one or more commands from a controller 106) when a person 112 is detected in the region 110. For example, the decreased time between pulses can result in faster MIR data generation for purposes of more quickly determining information about one or more persons 112 in the region 110. The emitted series of voltage pulses can be characterized by spectral components having high penetration that can pass through a range of materials and geometries in the region 110.

An object 112 (such as a person) in the probed region 110 can selectively reflect, refract, absorb, and/or otherwise scatter the emitted pulses. A return signal including a reflected, refracted, absorbed, and/or otherwise scattered signal can be received by a receive antenna 114. Optionally, the receive antenna 114 and transmit antenna 104 can be combined into a single antenna. In a single antenna embodiment, a filter (not shown) can be used to separate the return signal from the emitted pulse.

A probed region 110 can be defined according to an angular extent and distance from the transmit antenna 104 and the receive antenna 114. Distance can be determined by a range delay 116 configured to trigger a receiver 118 operatively coupled to the receive antenna 114. For example, the receiver 118 can include a voltage detector such as a capture-and-hold capacitor or network. The range delay corresponds to distance into the region 110. Range delay can be modulated to capture information corresponding to different distances.

A signal processor 120 can be configured to receive detection signals or data from the receiver 118 and the analog to digital converter 122, and by correlating range delay to the detection signal, extract data corresponding to the probed region 110 including the object 112.

Optionally, the MIR 101 can include a second receive antenna 114b. The second receive antenna can be operatively coupled to a second receiver 118b coupled to an output of the range delay 116 or a separate range delay (not shown) configured to provide a delay selected for a depth into the region 110. The signal processor 120 can further receive output from a second A/D converter 122b operatively coupled to the second receiver 118b.

The signal processor 120 can be configured to compare detection signals received by the antennas 114, 114b. For example, the signal processor 120 can search for common signal characteristics such as similar reflected static signal strength or spectrum, similar (or corresponding) Doppler shift, and/or common periodic motion components, and compare the respective range delays corresponding to detection by the respective antennas 114, 114b. Signals sharing one or more characteristics can be correlated to triangulate to a location of one or more objects 112 in the region 110 relative to known locations of the antennas 114, 114b. The triangulated locations can be output as computed ranges of angle or computed ranges of extent.

For example, a first signal corresponding to a reflected pulse received by an antenna element 114 can be digitized by an analog-to-digital converter (A/D) 122 to form a first digitized waveform. A second signal corresponding to the reflected pulse received by a second antenna element 114b can similarly be digitized by an A/D 122b (or alternatively by the same A/D converter 122) to form a second digitized waveform. The signal processor 120 can compare the first and second digitized waveforms and deduce angular information from the first and second digitized waveforms and known geometry of the first and second antenna elements.

A second pulse can be received at a second range delay 116 value and can be similarly signal processed to produce a second set of angular information that maps a second surface at a different distance. Depth within a given range delay can be inferred from a strength of the reflected signal. A greater number of signals can be combined to provide additional depth information. A series of pulses can be combined to form a time series of signals corresponding to the object 112 that includes movement information of the object 112 through the region 110. The object 112 described herein can include one or more persons.

The signal processor 120 outputs MIR data. The MIR data can include object location information, object shape information, object velocity information, information about inclusion of high density and/or conductive objects such as jewelry, cell phones, glasses including metal, etc., and physiological information related to periodic motion. The MIR data can include spatial information, time-domain motion information, and/or frequency domain information. Optionally, the MIR data can be output in the form of an image. MIR data in the form of an image can include a surface slice made of pixels or a volume made of voxels. Optionally, the image can include vector information.

The MIR data from the signal processor 120 is output to a signal analyzer 124. The signal analyzer 124 can be integrated with the signal processor 120 and/or can be included in the same MIR 101, as shown. Alternatively, the signal processor 120 can output MIR data through an interface to a signal analyzer 124 included in an apparatus separate from the MIR 101.

A signal analyzer 124 can be configured to extract desired information from MIR data received from the signal processor 120. Data corresponding to the extracted information can be saved in a memory for access by a data interface 126 or can be pushed out the data interface 126.

The signal analyzer 124 can be configured to determine the presence of a person 112 in the region 110. For example, MIR data from the signal processor can include data having a static spectrum at a location in the region 110, and a periodic motion spectrum corresponding to the location characteristic of a human physiological process (e.g. heartbeat and/or breathing). From the correspondence of such MIR data, it can be deduced that a person 112 is at the location in the region 110. The signal analyzer 124 can be configured to determine a number of persons 112 in the region 110. The signal analyzer 124 can be configured to determine the size of a person and/or relative size of anatomical features of a person 112 in the region 110. The signal analyzer 124 can be configured to determine the presence of an animal 112 in the region 110.

The signal analyzer 124 can be configured to determine movement and/or speed of movement of a person 112 through the region 110. The signal analyzer 124 can be configured to determine or infer the orientation of a person 112 such as the direction a person is facing relative to the region 110. The signal analyzer 124 can be configured to determine one or more physiological aspects of a person 112 in the region 110. The signal analyzer 124 can determine presence of a personal appliance such as a cell phone, PDA, etc. and/or presence of metalized objects such as credit cards, smart cards, access cards, etc. The signal analyzer 124 can infer the gender and age of one or more persons based on returned MIR data. For example, male bodies can generally be characterized by higher mass density than female bodies, and thus can be characterized by somewhat greater reflectivity at a given range. Adult female bodies can exhibit relatively greater harmonic motion ("jiggle") responsive to movements, and can thus be correlated to harmonic spectra characteristics. Older persons generally move differently than younger persons, allowing an age inference based on detected movement in the region 110.

By determination of one or more such aspects and/or combinations of aspects, the signal analyzer 124 can determine a demographic of one or more persons 112 in the region 110.

For example, MIR data can include movement corresponding to the beating heart of one or more persons 112 in the region 110. The signal analyzer 124 can filter the MIR data to remove information not corresponding to a range of heart rates, and determine one or more heart rates by comparing movement of the heart surface to the MIR signal rate. The one or more heart rates can further be characterized according to a confidence factor, depending on statistical certainty regarding the determined one or more heart rates.

Similarly, the signal analyzer 124 can determine one or more respiration rates by measuring movement corresponding to the chest or diaphragm of one or more persons 112. The signal analyzer 124 can determine movement, a direction of movement, and/or a rate of movement of one or more persons 112 in the region 110. Operation of the signal analyzer 124 is described in greater detail below by reference to FIGS. 2 and 3.

An electronic controller 106 can be operatively coupled to the pulse generator 102, the transmitter 108, the range delay 116, the receiver 118, the analog-to-digital converter 122, the signal processor 120, and/or the signal analyzer 124 to control the operation of the components of the MIR 101. For embodiments so equipped, the electronic controller 106 can also be operatively coupled to the second receiver 118b, and the second analog-to-digital converter 122b. The data interface 126 can include a high speed interface configured to output data from the signal analyzer 124. Alternatively, for cases where signals are analyzed externally to the MIR, the data interface 126 can include a high speed interface configured to output MIR data from the signal processor 120. The data interface 126 can include an interface to the controller 106. Optionally, the controller 106 can be interfaced to external systems via a separate interface (not shown).

Figure 2:
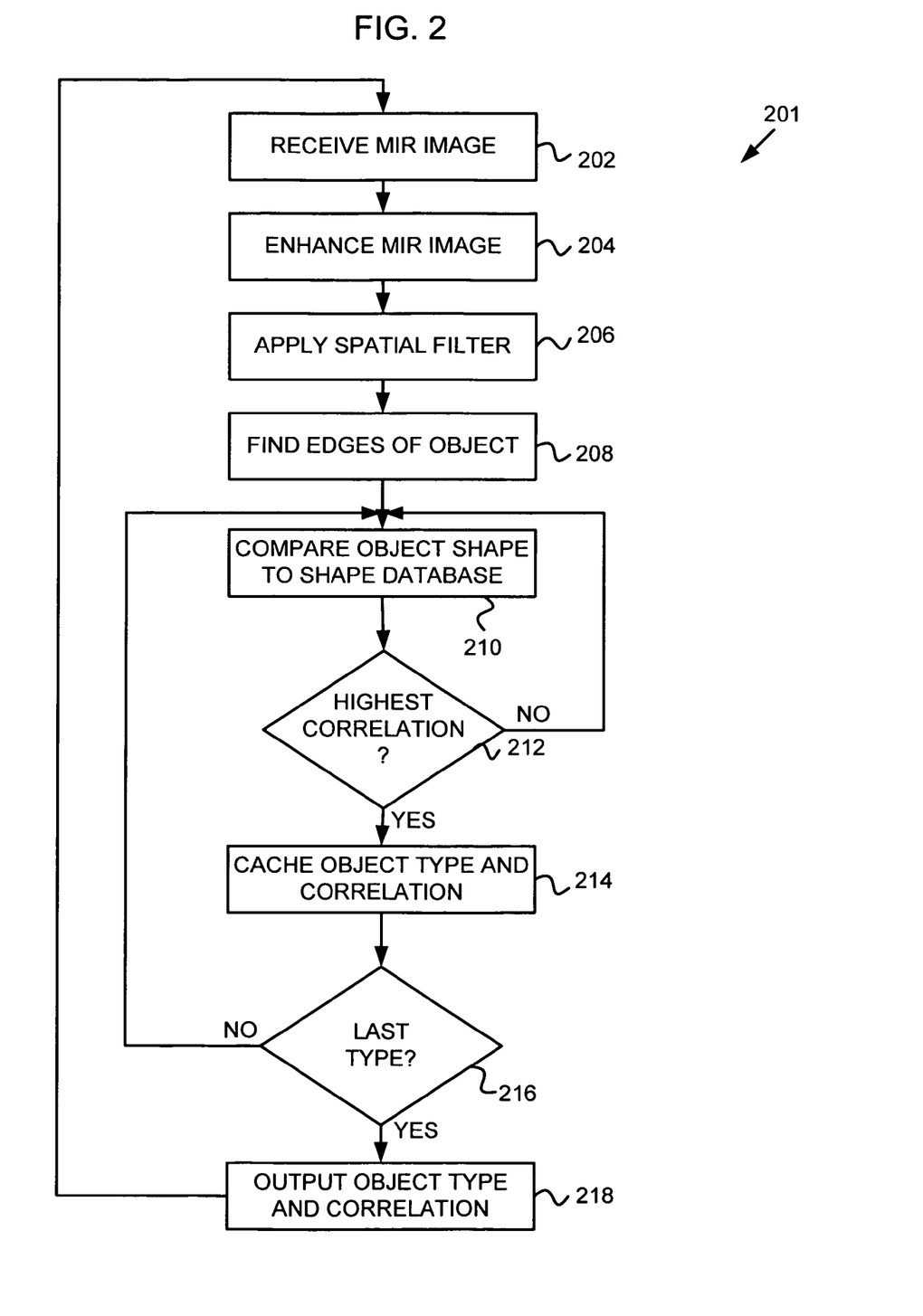
FIG. 2 is a flow chart showing an illustrative process for determining the presence of a person in a region with the MIR of FIG. 1, according to an embodiment.

FIG. 2 is a flow chart showing an illustrative process 201 for determining the presence of one or more persons 112 in the region 110 with the signal analyzer 124 of the MIR 101, according to an embodiment. Beginning with step 202, MIR data is received as described above in conjunction with FIG. 1. The MIR data can correspond to a plurality of probes of the region 110. Proceeding to optional step 204, the MIR data can be enhanced to facilitate processing. For example, grayscale data corresponding to static reflection strength as a function of triangulated position can be adjusted, compressed, quantized, and/or expanded to meet a desired average signal brightness and range. Additionally or alternatively, velocity information corresponding to Doppler shift, and/or frequency transform information corresponding to periodically varying velocity can similarly be adjusted, compressed, quantized, and/or expanded. Systematic, large scale variations in brightness can be balanced, such as to account for side-to-side variations in antenna coupling to the region. Contrast can be enhanced such as to amplify reflectance variations in the region.

Proceeding to optional step 206, a spatial filter can be applied. Application of a spatial filter can reduce processing time and/or capacity requirements for subsequent steps described below. The spatial filter may, for example, include a computed angle or computed extent filter configured to remove information corresponding to areas of contrast, velocity, or frequency component(s) having insufficient physical extent to be large enough to be an object of interest. The spatial filter may, for example, identify portions of the region 110 having sufficient physical extent to correspond to body parts or an entire body of a person 112, and remove features corresponding to smaller objects such as small animals, leaves of plants, or other clutter. According to an embodiment, the spatial filter can remove information corresponding to areas of contrast, velocity, or frequency component(s) having physical extent greater than a maximum angle or extent that is likely to correspond to a person or persons 112. In other embodiments, the spatial filter applied in step 206 can eliminate small, low contrast features, but retain small, high contrast features such as jewelry, since such body ornamentation can be useful in some subsequent processes. The step of applying the spatial filter 206 can further include removing background features from the MIR data. For example, a wall lying between an antenna 104, 114 and the region 110 can cast a shadow such as a line in every MIR signal. Removal of such constant features can reduce subsequent processing requirements.

Proceeding to optional step 208, an edge-finder can identify edges of objects 112 in the region 110. For example, a global threshold, local threshold, second derivative, or other algorithm can identify edge candidates. Object edges can be used, for example, to identify object shapes, and thus relieve subsequent processes from operating on grayscale data. Alternatively, step 208 can be omitted and the process of identifying objects can be performed on the grayscale MIR data.

Proceeding to step 210, processed data corresponding to the MIR data is compared to a database to determine a match. The object data received from step 202 (and optionally steps 204, 206, and/or 208) can be compared to corresponding data for known objects in a shape database. Step 210 can be performed on a grayscale signal, but for simplicity of description it will be assumed that optional step 208 was performed and matching is performed using object edges, velocity, and/or spectrum values. For example, the edge of an object 112 in the region 110 can include a line corresponding to the outline of the head and torso, cardiac spectrum, and movements characteristic of a young adult male. A first shape in the shape database can include the outline of the head and torso, cardiac spectrum, density, and movements characteristic of a young adult female and/or the head and torso outline, cardiac spectrum, density, and movements characteristic of a generic human. The differences between the MIR data and the shape database shape can be measured and characterized to derive a probability value. For example, a least-squares difference can be calculated.

Optionally, the object shape from the MIR data can be stepped across, magnified, and stepped up and down the shape database data to minimize a sum-of-squares difference between the MIR shape and the first shape in the shape database. The minimum difference corresponds to the probability value for the first shape.

Proceeding to step 212, if the probability value for the first shape is the best probability yet encountered, the process proceeds to step 214. For the first shape tested, the first probability value is the best probability yet encountered. If an earlier tested shape had a higher probability to the MIR data, the process loops back from step 212 to step 210 and the fit comparison is repeated for the next shape from the shape database.

In step 214, the object type for the compared shape from the shape database and the best probability value for the compared shape are temporarily stored for future comparison and/or output. For example, the compared shape from the shape database can be identified by metadata that is included in the database or embedded in the comparison data. Proceeding to step 216, the process either loops back to step 210 or proceeds to step 218, depending on whether a test is met. If the most recently compared shape is the last shape available for comparison, then the process proceeds to step 218. Optionally, if the most recently compared shape is the last shape that the process has time to compare (for example, if a new MIR data is received and/or if another process requires output data from the process 201) then the process proceeds to step 218. In step 218, the object type and the probability value is output. The process can then loop back to step 202 and the process 201 can be repeated.

Otherwise, the process 201 loops from step 216 back to step 210. Again, in step 210, the next comparison shape from a shape database is loaded. According to an embodiment, the comparison can proceed from the last tested shape in the shape database. In this way if the step 218 to 202 loop occurs more rapidly than all objects in the shape database can be compared, the process eventually works its way through the entire shape database. According to an embodiment, the shape database can include multiple copies of the same object at different orientations, distances, and positions within the region. This can be useful to reduce processing associated with stepping the MIR shape across the shape database shape and/or changing magnification.

The object type can include determination of a number of persons 112 in the region 110. For example, the shape database can include outlines, cardiac and/or respiration spectra, density, and movement characteristics for plural numbers of persons. According to embodiments, the shape library can include shapes not corresponding to persons. This can aid in identification of circumstances where no person 212 is in the region 210. Optionally, process 201 can be performed using plural video frames such as averaged video frames or a series of video frames. Optionally, steps 212, 214, and 216 can be replaced by a single decision step that compares the probability to a predetermined value and proceeds to step 218 if the probability meets the predetermined value. This can be useful, for example, in embodiments where simple presence or absence of a person 212 in the region 210 is sufficient information.

According to an embodiment, the signal analysis process 201 of FIG. 2 can be performed using conventional software running on a general-purpose microprocessor. Optionally, the process 201 can use various combinations of hardware, firmware, and software; and can include the use of a digital signal processor.

Figure 3:
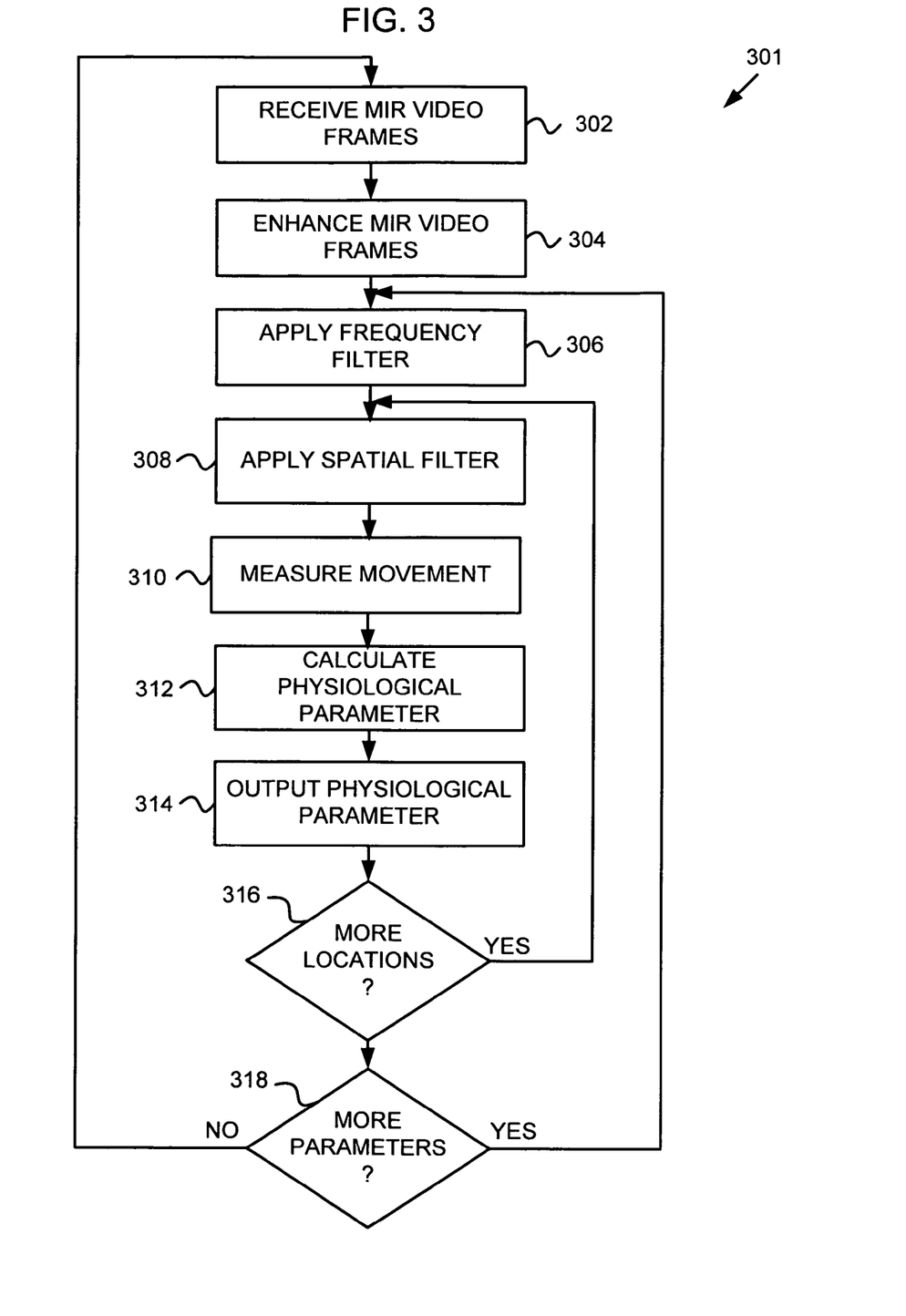
FIG. 3 is a flow chart showing an illustrative process for determining a physiological parameter of a person in a region with the MIR of FIG. 1, according to an embodiment.

FIG. 3 is a flow chart showing an illustrative process 301 for determining one or more particular physiological parameters of a person 112 in the region 110 with the signal analyzer 124 of the MIR 101, according to an embodiment. Optionally, the process 301 of FIG. 3 can be performed conditional to the results of another process such as the process 201 of FIG. 2. For example, if the process 201 determines that no person 112 is in the region 110, then it can be preferable to continue to repeat process 201 rather than execute process 301 in an attempt to extract one or more particular physiological parameters from a person that is not present.

Beginning with step 302, a series of MIR time series data is received. While the received time series data need not be purely sequential, the process 301 generally needs the time series data received in step 302 to have a temporal capture relationship appropriate for extracting time-based information. According to an embodiment, the MIR time series data can have a frame rate between about 16 frames per second and about 120 frames per second. Higher capture rate systems can benefit from depopulating frames, such as by dropping every other frame, to reduce data processing capacity requirements.

Proceeding to step 304, the MIR video frames can be enhanced in a manner akin to that described in conjunction with step 204 of FIG. 2. Optionally, step 304 can include averaging and/or smoothing across multiple MIR time series data. Proceeding to optional step 306, a frequency filter can be applied. The frequency filter can operate by comparing changes between MIR time series data to a reference frequency band for extracting a desired physical parameter. For example, if a desired physiological parameter is a heart rate, then it can be useful to apply a pass band for periodic movements having a frequency between about 20 cycles per minute and about 200 cycles per minute, since periodic motion beyond those limits is unlikely to be related to a human heart rate. Alternatively, step 304 can include a high pass filter that removes periodic motion below a predetermined limit, but retains higher frequency information that can be useful for determining atypical physiological parameters.

Proceeding to optional step 308, a spatial filter can be applied. The spatial filter may, for example, include a pass band filter configured to remove information corresponding to areas of contrast having insufficient physical extent to be large enough to be an object of interest, and remove information corresponding to areas too large to be an object of interest. The spatial filter may, for example, identify portions of the region 110 having sufficient physical extent to correspond to the heart, diaphragm, or chest of a person 112, and remove signal features corresponding to smaller or larger objects. The step of applying the spatial filter 308 can further include removing background features from the MIR data. For example, a wall lying between an antenna 104, 114 (114b) and the region 110 can cast a shadow such as a line in every instance of MIR data. Removal of such constant features can reduce subsequent processing requirements.

Proceeding to step 310, movement such as periodic movement in the MIR time series data is measured. For example, when a periodic motion is to be measured, a time-to-frequency domain transform can be performed on selected signal elements. For example, when a non-periodic motion such as translation or rotation is to be measured, a rate of movement of selected signal elements can be determined. Optionally, periodic and/or non-periodic motion can be measured in space vs. time. Arrhythmic movement features can be measured as spread in frequency domain bright points or can be determined as motion vs. time. Optionally, subsets of the selected signal elements can be analyzed for arrhythmic features. Optionally plural subsets of selected signal elements can be cross-correlated for periodic and/or arrhythmic features. Optionally, one or more motion phase relationships between plural subsets of selected signal features, between a subset of a selected signal feature and the signal feature, or between signal features can be determined.

For example, a person with a hiccup can be detected as a non-periodic or arrhythmic motion superimposed over periodic motion of a signal element corresponding to the diaphragm of the person.

Proceeding to step 312, a physiological parameter can be calculated. For example, MIR data can include data having a periodic motion spectrum corresponding to the location characteristic of a human physiological process (e.g. heartbeat and/or breathing). Step 312 can include determining one or more heart rates by comparing movement of the heart surface to the MIR signal rate. The one or more heart rates can further be characterized according to a confidence factor, depending on statistical certainty regarding the determined one or more heart rates. Similarly, step 312 can include determining one or more respiration rates by measuring movement corresponding to the chest or diaphragm of one or more persons.

Proceeding to step 314, the physiological parameter can be output. Proceeding to step 316, if there are more locations to measure, the process 301 can loop back to execute step 308. If there are not more locations to measure, the process can proceed to step 318. In step 318, if there are more physiological parameters to measure, the process 301 can loop back to execute step 306. If there are not more physiological parameters to measure, the process 301 can loop back to step 302, and the process 301 of FIG. 3 can be repeated.

Figure 4:
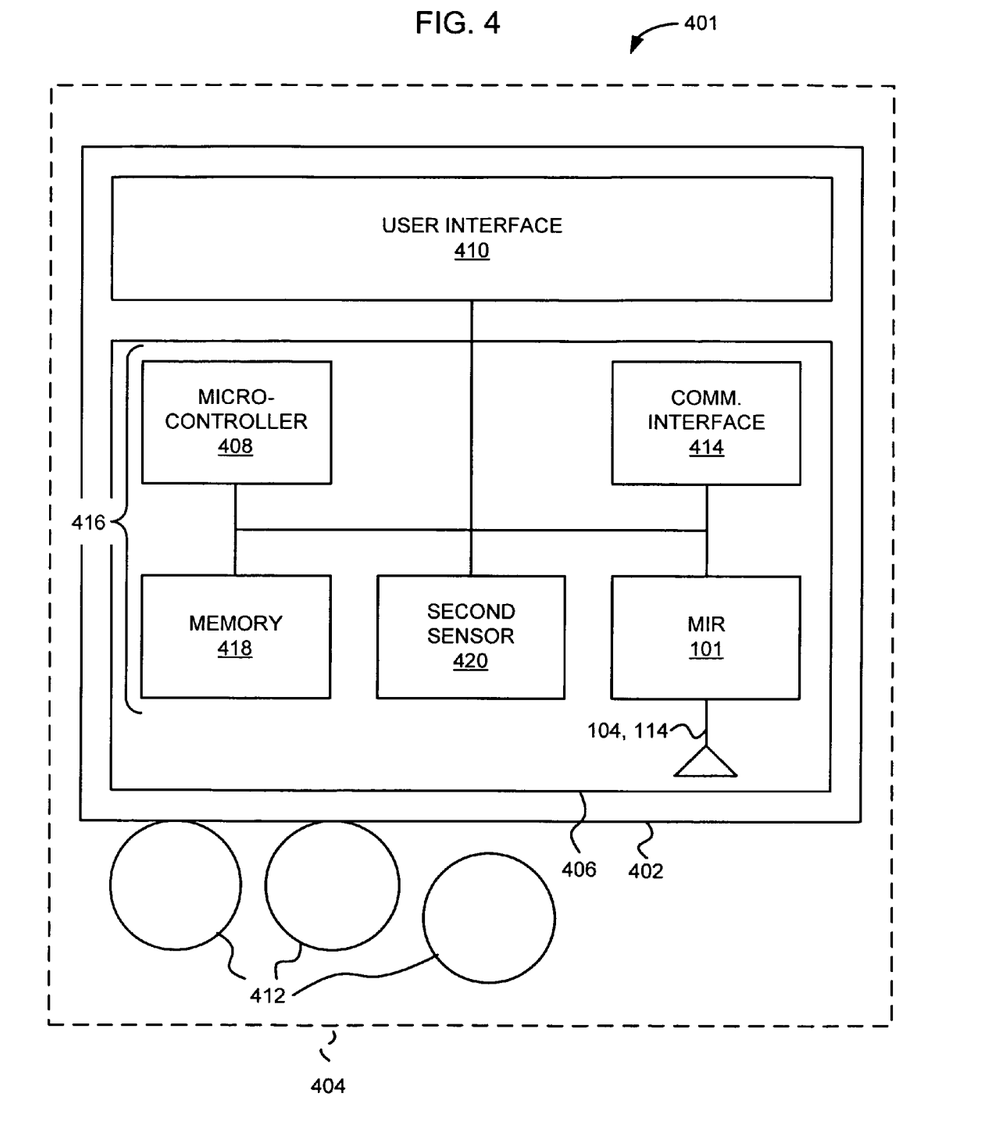
FIG. 4 is a block diagram of a personal electronic device including a micro-impulse radar, according to an embodiment.

FIG. 4 is a block diagram of a personal electronic device 401 including a MIR 101, according to an embodiment. The personal electronic device 402 can be a cellular phone, a smart phone, a personal data assistant, a pager, or a tablet computer, for example. The device 401 can include at least one MIR 101 operatively coupled to the personal electronic device 402 and configured to probe one or more regions 404 near the personal electronic device 402. The MIR 101 can be operatively coupled to the personal electronic device 402 via an exposed interface. For example, the exposed interface can include a USB interface, a SIM card interface, a WiFi interface, a BlueTooth interface, a ZigBee interface, an infrared interface, or a proprietary interface.

Alternatively, at least a portion of the MIR 101 can be located inside the personal electronic device 402. The personal electronic device 402 can include at least one circuit board 406. At least a portion of the MIR 101 can be integrated with the circuit board(s) 406. The MIR 101 can include one or more antennas 104, 114 formed as electrical traces on the circuit board(s) 406. Optionally, the MIR 101 can include a pulse generator (see FIG. 1, 102) and a range delay (see FIG. 1, 116) embodied as operations of a microcontroller or microprocessor 408. Furthermore, the MIR 101 can include at least one receiver (see FIG. 1, 118) embodied as one or more capture-and-hold capacitors (not shown) on the circuit board(s) 406 operatively coupled to antenna(s) 104, 114. Alternatively, the capture-and-hold capacitor(s) can be integrated into the microcontroller or microprocessor 408. Optionally, the MIR 101 can also include a signal processor (see FIG. 1, 120) embodied as software or firmware running on the microcontroller or microprocessor 408.

Optionally, the MIR 101 can be configured in a bistatic architecture with at least one component of the MIR 101 being in the personal electronic device 402, and at least one other component of the MIR being located separately. For example, the personal electronic device can include at least one transmitter (see FIG. 1, 108) or at least one receiver component (see FIG. 1, 118) of the MIR 101. Alternatively, the MIR 101 can be made according to a monostatic architecture, with substantially the entire MIR being in the personal electronic device 402.

The personal electronic device 402 can include a user interface 410. The user interface 410 can include a display, or alternatively, one or more of a haptic or audio output device. The personal electronic device 402 can output user perceptible data on the user interface 410 corresponding to MIR data from the MIR 101. The personal electronic device 402 can be configured to output the user perceptible data as a minimally-processed representation of MIR data from the MIR 101 or as a processed representation of MIR data from the MIR 101. For example, the user perceptible data can include a display indicating the location of objects 412 imaged by the MIR 101 in association with a map. Optionally, the personal electronic device 402 can output a representation of one or more operating parameters selected or changed responsive to MIR data from the MIR 101.

Optionally, the personal electronic device 402 can include a network communication interface 414 configured to output MIR data to a network resource (not shown). The network communication interface 404 can be configured to receive data determined responsive to MIR data from the MIR 101 from the network resource (not shown).

The personal electronic device 402 can include logic circuitry 416 operatively coupled to the MIR 101 and configured to analyze MIR data from the MIR 101. The logic circuitry 416 can include the microcontroller or microprocessor 408, memory 418, and/or other related components.

The logic circuitry 416 can also be operatively coupled to the user interface 410. The user interface 410 can receive user commands corresponding to one or more interactions between the MIR 110 and the logic circuitry 416. The interaction(s) can include a manual MIR 101 probe or automatic interaction(s). For example, automatic interaction(s) can include one or more of a schedule of probes, coupling to a computer program-driven control, and/or coupling to received external commands. Commands received through the user interface 410 can include selection of a MIR probe direction or selection of sensitivity to a subset of probe regions 404.

Optionally, the personal electronic device 402 can include one or more second sensors 420 operatively coupled to the logic circuitry 416. For example, the personal electronic device 402 can include logic circuitry 416 operatively coupled to the MIR 101 and/or the one or more second sensors 420. The logic circuitry 416 can be configured to select one or more operating parameters for the personal electronic device 402 responsive to data or signals from the one or more second sensors 420 and/or data from the MIR 101.

Optionally, the logic circuitry 416 can be configured to output data via the user interface 410 responsive to data or signals from the second sensor(s) 420 and/or responsive to data from the MIR 101. The second sensor(s) 420 can include one or more of a microphone, a camera, a motion sensor, an accelerometer, a magnetic field sensor, an electronic compass, a gyroscope, a gravitational field sensor, a global positioning system receiver, a capacitive sensor, a microswitch, a light sensor, an infrared sensor, a radio frequency sensor, a microwave sensor, a millimeter wave sensor, and/or a vibration sensor, for example.

Figure 5:
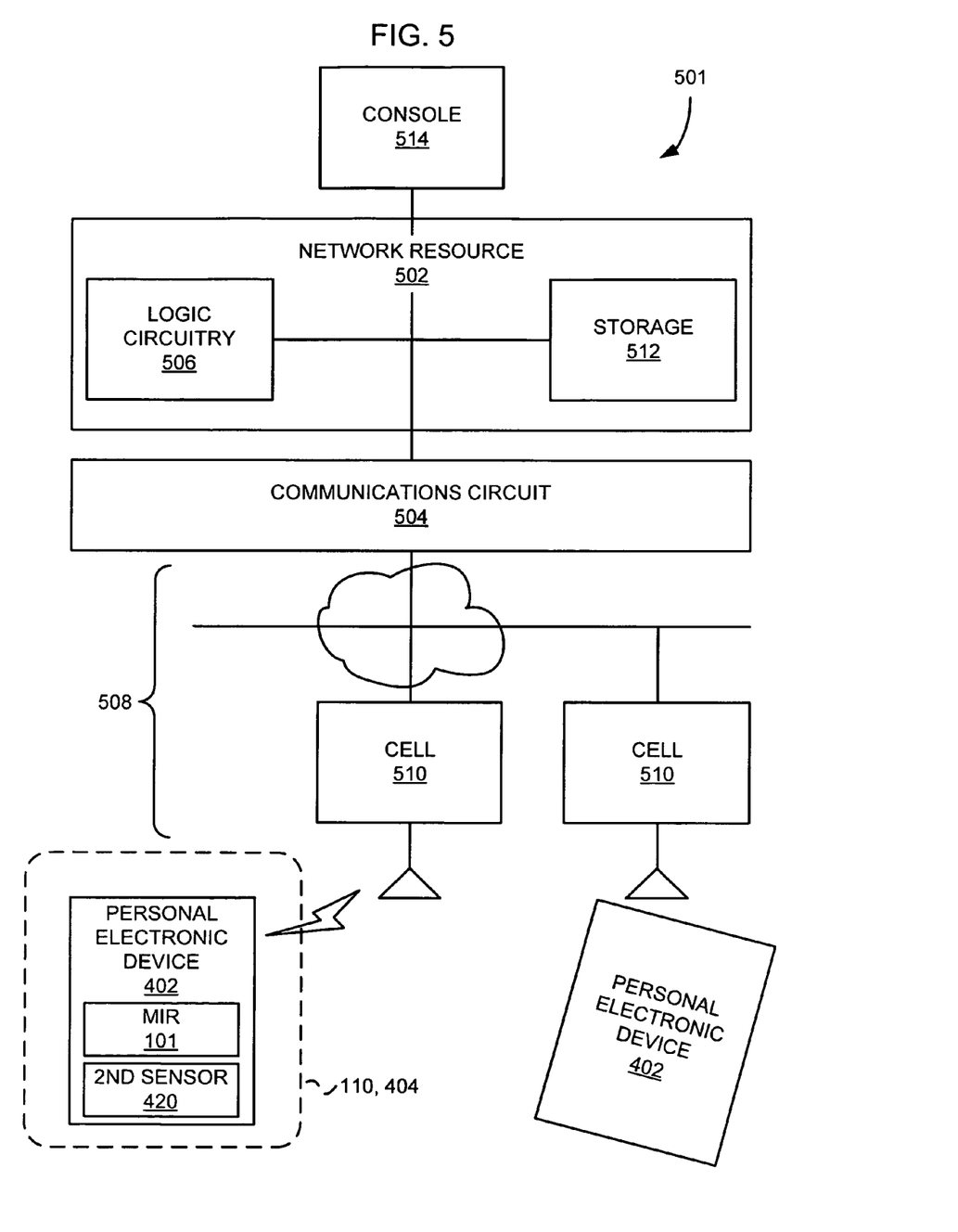
FIG. 5 is a block diagram of a system including a network resource configured to be operatively coupled to one or more personal electronic devices including micro-impulse radars, according to an embodiment.

FIG. 5 is a block diagram of a system 501 including a network resource 502 configured to be operatively coupled to one or more personal electronic devices 402 including MIRs 101, according to an embodiment. The network resource 502 can be configured to receive MIR data from one or more personal electronic devices 402. A communications circuit 504 can be configured to operatively couple the one or more personal electronic devices 402 to the network resource 502. Each personal electronic device 402 can be operatively coupled to at least one MIR 101, and each personal electronic device 402 can be configured to transmit MIR data from the MIR 101 to the network resource 502.

The personal electronic devices 402 can include one or more of cellular phones, smart phones, tablet computers, or pagers, for example. In some embodiments, at least a portion of the MIRs 101 can operatively coupled to at least a portion of the personal electronic devices 402 via exposed interfaces (not shown). Such exposed interfaces can include USB interfaces, SIM card interfaces, WiFi interfaces, BlueTooth interfaces, ZigBee interfaces, infrared interfaces, and/or proprietary interfaces, for example.

Alternatively, at least a portion of the MIRs 101 can be located inside at least a portion of the personal electronic devices 402. That is, at least a portion of the one or more personal electronic devices 402 can include at least one component of the MIR 101. For example, least a portion of the one or more personal electronic devices 402 can include at least one transmitter component (see FIG. 1, 108) of the MIR 101 and/or at least a portion of the one or more personal electronic devices 402 can include at least one receiver component (see FIG. 1, 118) of the MIR 101. At least a portion of the one or more personal electronic devices 402 include at least one component of a monostatic MIR 101.

Alternatively or additionally, at least a portion of the one or more personal electronic devices 402 can include at least one component of a bistatic MIR 101. In a bistatic MIR architecture, a first MIR portion (not shown) can physically associated with one of the personal electronic devices 402 and a second MIR portion (not shown) can be not physically associated with (i.e., separate from) the personal electronic device 402.

According to some embodiments, the entire MIR 101 can be located inside at least a portion of the personal electronic devices 402, as depicted diagrammatically in FIG. 5.

The network resource 502 can include logic circuitry 506 configured to analyze the MIR data from the one or more personal electronic devices 402. The logic circuitry 506 can be configured to perform one or more logical operations to produce at least one parameter that is a function of the MIR data. The parameter(s) can include at least one personal electronic device 402 parameter. Accordingly, the logic circuitry 506 can be configured to select one or more operating parameters of each portable electronic device 402 responsive to the MIR data. The network resource 502 can accordingly be further configured to transmit the one or more operating parameters to each portable electronic device 402 via the communications circuit 504.

The logic circuitry 506 can be configured to compare the MIR data to one or more criteria, and output data or select operating parameters responsive to the comparison. The one or more criteria can include range, strength-of-response, direction, spectral characteristics, polarization, and/or Doppler characteristics, for example.

The logic circuitry 506 can be configured to determine or infer, from the MIR data, an environment 110, 404 of the personal electronic device 402.

Optionally, at least a portion of the one or more personal electronic devices 402 can include one or more second sensors 420 operatively coupled to the personal electronic device 402. The network resource 502 can be configured to receive data or signals from the one or more second sensors 420. The logic circuitry 506 can be configured to select at least one parameter responsive to the data or signals from the one or more second sensors 420 and data from the MIR 101. For example, the one or more second sensors 420 can include a microphone, a camera, a motion sensor, an accelerometer, a magnetic field sensor, an electronic compass, a gyroscope, a gravitational field sensor, a global positioning system receiver, a capacitive sensor, a microswitch, a light sensor, an infrared sensor, a radio frequency sensor, a millimeter wave sensor, and/or a vibration sensor, for example. Accordingly, a combination of MIR data and second sensor data can be used to determine or infer the environment 110, 404; and the combination of MIR data and second sensor data can be used together by the logic circuitry 506 to select the parameter.

Optionally, in some embodiments, the MIR 101 can be omitted and the second sensor 420 can provide data for determining or inferring the environment 110, 404 of the personal electronic device 402 and/or determining the parameter. For example, a camera 420 on the personal electronic device 402 can provide data to determine if a user is in the field-of-view of the camera 420, which in turn may be used by the logic circuitry 506 to determine if a user is in a region 110, 404 proximate the personal electronic device 402. In another example, a microphone 420 can provide data to indicate if the personal electronic device 402 is in a quiet environment or a noisy environment 110, 404 and/or, using voice or sound recognition technology, whether the environment 110, 404 corresponds to a conference, a class, a play, a motor vehicle, or other environment.

The at least one parameter determined by the logic circuit 506 can include at least one network 508 parameter. In an embodiment, the at least one network 508 parameter can include at least one network access parameter. For example, the at least one network 508 parameter can include a restricted network access parameter selected to restrict network access for a personal electronic device 402 determined or inferred to be in a restricted access environment 110, 404.

In another example, the at least one network 508 parameter can include a network call admission parameter. The network call admission parameter can be a function of a number, proportion, projected number, or projected proportion of personal electronic devices 402 assigned a restricted network access parameter. The call admission parameter can correspond to a shorter call acceptance time responsive to the call admission parameter being predictive of at least a portion of personal electronic devices 402 not being granted network 508 access. A network call admission parameter can be selected to span a network 508 or can span a cell 510 or a subset of a cell 510 (such as a beamformed subset of the cell 510).

Alternatively or additionally, the at least one network parameter can include an individual call admission parameter corresponding to a pre-admission function selected for a particular personal electronic device 402 to reduce call acceptance time responsive to a personal electronic device environment 110, 404 corresponding to a likelihood of a call being made. For example, a personal electronic device environment 110, 404 corresponding to a likelihood of a call being made can include a detected user (not shown) approaching the personal electronic device 402 or reaching for the personal electronic device 402. Alternatively, a personal electronic device environment 110, 404 corresponding to a likelihood of a call being made can include the personal electronic device 402 not being in a detected restricted network access environment 110, 404.

Alternatively or additionally, the network 508 parameter can include a network switching parameter. For example, the network switching parameter can be selected to switch personal electronic devices 402 corresponding to a limited access parameter to a reduced bandwidth allocation.

Alternatively or additionally, the network 508 parameter can include a network forwarding parameter. The network resource can include storage 512, or the network resource can be operatively coupled to external storage (not shown). The network forwarding parameter can correspond to a logical state selected to forward to storage 512 traffic addressed to a personal electronic device 402 corresponding to a limited network access parameter. The network forwarding parameter can similarly correspond to a logical state selected to forward stored traffic from storage 512 to a personal electronic device 402. This logical state can be invoked, for example, when the network access parameter for the personal electronic device 402 changes from restricted access parameter responsive to an inference of the personal electronic device 402 leaving a restricted access environment 110, 404.

Optionally, the network resource 502 can be further configured to output data corresponding to the MIR data received from a personal electronic device 402. Accordingly, the network resource 502 can be configured to output the data corresponding to the MIR data to the corresponding personal electronic device 402. Alternatively or additionally, the network resource 502 is configured to output the data corresponding to the MIR data to a console 514, to storage 512, or to a client or subscriber 402' other than the personal electronic device 402.

According to an embodiment, the data corresponding to the MIR data can include a location of objects (not shown) in the region 110, 404 imaged by the MIR 101 in association with a map. The network resource 502 can be configured to output the data corresponding to the MIR data as a minimally-processed representation of the MIR data. The network resource 502 can alternatively or additionally be configured to output the data corresponding to the MIR data as a processed representation of the MIR data. Alternatively or additionally, the network resource 502 can be configured to output a representation of one or more network 508 or personal electronic device 402 parameters selected or changed responsive to MIR data from the MIR 101. This representation can be displayed on the personal electronic device 402 to advise the user of a need to modify his or her expectation of network 508 or personal device 402 operation or response, for example.

Figure 6:
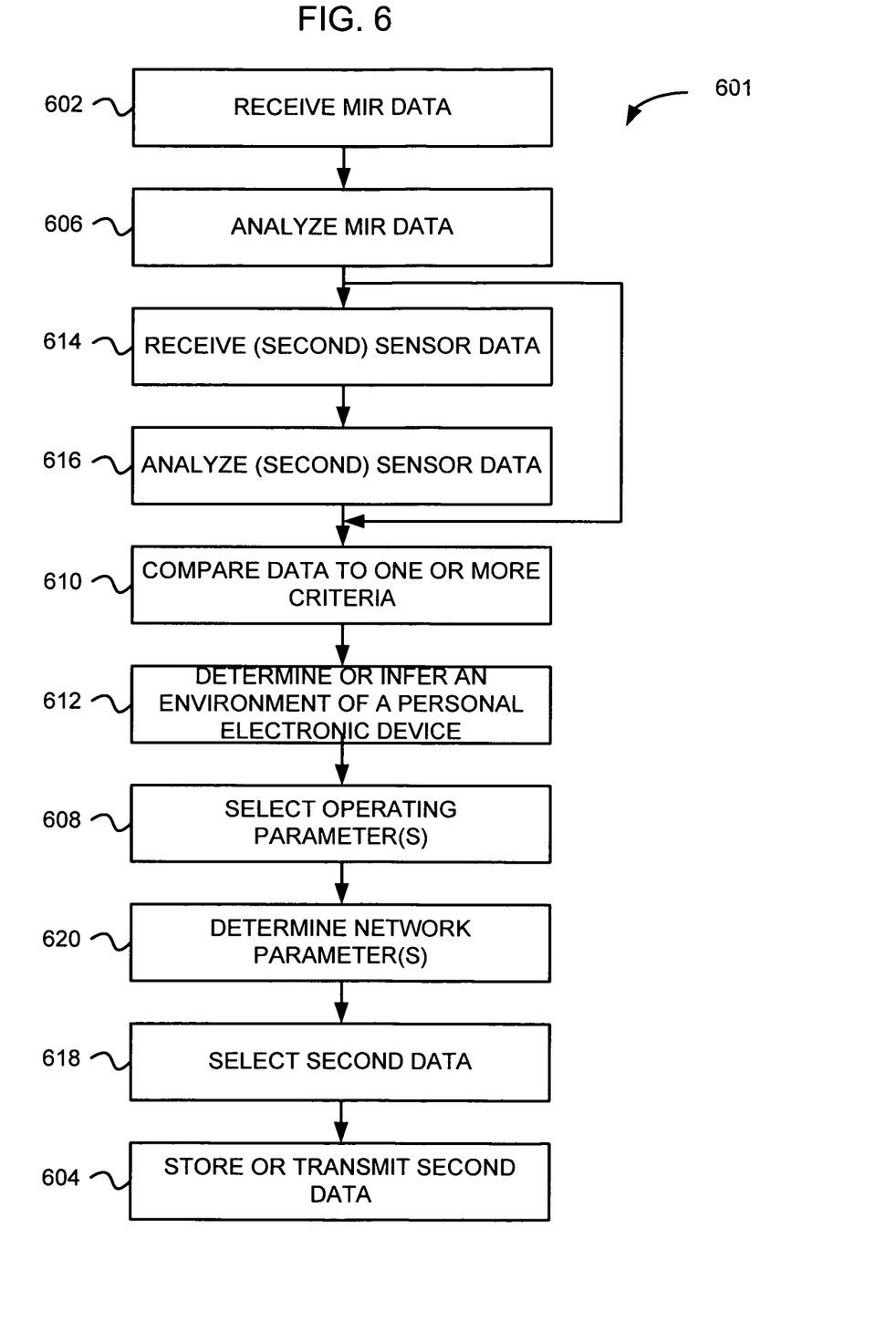
FIG. 6 is a flow chart showing a method for determining an environment of a personal electronic device, according to an embodiment.

FIG. 6 is a flow chart showing a method 601 for determining an environment of a personal electronic device, such as an environment 404 near a personal electronic device 402 shown in block diagram form in FIG. 4, according to an embodiment. In at least some embodiments, some or all of the steps of the method 601 can be performed by the logic circuitry 506 in cooperation with other components of the system 501 shown in FIG. 5.

According to an embodiment, the method 601 can begin with step 602, where MIR data is received from one or more personal electronic devices, and proceed through step 604 where second data corresponding to the received MIR data is stored or transmitted. Receiving the MIR data 602 and storing or transmitting the second data 604 can be performed by a network resource operatively coupled to the one or more personal electronic devices across a communication network.

According to embodiments, the second data can include at least one parameter that is a function of the MIR data. For example, the parameter(s) can include at least one personal electronic device parameter.

The one or more personal electronic devices can include one or more cellular phones, smart phones, tablet computers, pagers, and/or a combination thereof. Each of the personal electronic device(s) can be operatively coupled to at least one MIR. The MIR(s) can be operatively coupled to the personal electronic device(s) via an exposed interface (such as a USB interface, a SIM card interface, a WiFi interface, a BlueTooth interface, a ZigBee interface, an infrared interface, and/or a proprietary interface, for example); or at least a portion of each of the MIRs can be located inside at least a portion of the personal electronic devices. The MIR(s) can be made according to monostatic or bistatic architecture(s), and with components distributed as described in conjunction with FIG. 5, above. In some embodiments, an entire or substantially an entire MIR can be located inside each of at least a portion of the personal electronic devices.

After receiving the MIR data in step 602, the method 601 can proceed to step 606, where the MIR data from the one or more personal electronic devices can be analyzed. Proceeding to step 608, one or more operating parameters for the one or more portable electronic devices can be selected responsive to the MIR data. Accordingly, storing or transmitting the second data in step 604 can include transmitting the one or more operating parameters to the one or more portable electronic devices.

Optionally, the method 601 can include step 610 where the MIR data is compared to one or more criteria, and the second data stored or transmitted in step 604 can include one or more operating parameters selected responsive to the comparison. (Alternatively, step 610 can be considered to be included in step 606.) The one or more criteria to which the MIR data can be compared in step 610 can include one or more of range, strength-of-response, direction, spectral characteristics, polarization, and/or Doppler characteristics, for example.

The method 601 of FIG. 6 can include step 612, wherein an environment of a particular personal electronic device is determined or inferred from the MIR data. Alternatively, step 612 can be considered to be inherent in step 606 and/or step 610. The method 601 can also include step 618, wherein the second data is selected. Alternatively, step 618 can, in some embodiments, be considered inherent in step 608 and/or step 620 (described below). Alternatively, step 608 and/or step 620 can be considered inherent in step 618.

Optionally, at least some of the personal electronic devices can include or be otherwise operatively coupled to one or more sensors (also referred to as a second sensor) in addition to the MIR. Accordingly, the method 601 can optionally include step 614, where (second) sensor data is received from the one or more personal electronic devices. The logic circuitry of the network resource can then proceed to step 616, wherein the (second) sensor data is analyzed. For embodiments that include steps 614 and 616, a step 618 can include selecting the second data including at least one parameter responsive to both the MIR data and the sensor data data.

The one or more second sensors can include various sensor types. For example, the one or more second sensors can include, for at least a subset of the one or more personal electronic devices, one or more of a microphone, a camera, a motion sensor, an accelerometer, a magnetic field sensor, an electronic compass, a gyroscope, a gravitational field sensor, a global positioning system receiver, a capacitive sensor, a microswitch, a light sensor, an infrared sensor, a radio frequency sensor, a microwave sensor, a millimeter wave sensor, and/or a vibration sensor.

According to some embodiments, the second data that is stored or transmitted in step 614 can include at least one network parameter. The method 601 can thus also include step 620, wherein at least one network parameter can be determined responsive to the MIR data analysis in step 606 (or alternatively, step 610 and/or step 612).

According to embodiments, the at least one network parameter determined in step 620 can include at least one network access parameter. For example, analyzing the MIR data in step 606 (and/or optionally analyzing sensor data in step 616), or alternatively steps 610 and/or 612, can include inferring or determining that a particular personal electronic device is in a restricted access environment. The at least one network parameter determined in step 620 can include a restricted network access parameter selected to restrict network access for the particular personal electronic device determined or inferred to be in the restricted access environment.

According to embodiments, the at least one network parameter determined in step 620 can include a network call admission parameter as a function of a number, proportion, projected number, or projected proportion of the one or more personal electronic devices assigned a restricted network access parameter. For example, the call admission parameter can correspond to a shorter call acceptance time responsive to the call admission parameter being predictive of at least a portion of personal electronic devices not being granted network access. The network call admission parameter can be selected to span a network, or can be selected to span a cell or a beamformed subset of a cell. Optionally, the at least one network parameter can include an individual call admission parameter corresponding to a pre-admission function selected for a particular personal electronic device to reduce call acceptance time responsive to a particular personal electronic device environment corresponding to a likelihood of a call being made. For example, a personal electronic device environment corresponding to a likelihood of a call being made can include a detected user approaching the particular personal electronic device or reaching for the particular personal electronic device. Alternatively, a personal electronic device environment corresponding to a likelihood of a call being made can include the particular personal electronic device not being in a detected restricted network access environment.

According to embodiments, the at least one network parameter determined in step 620 can include a network switching parameter. For example, a network switching parameter can be selected to switch personal electronic devices corresponding to a limited access parameter to a reduced bandwidth allocation.

According to embodiments, the at least one network parameter determined in step 620 can include network forwarding parameter. For example, the network forwarding parameter can correspond to a logical state selected to forward to storage traffic addressed to a particular personal electronic device corresponding to a limited network access parameter. Similarly, the network forwarding parameter can correspond to a logical state selected to forward stored traffic from storage to a particular personal electronic device when the network access parameter for the particular personal electronic device changes from restricted access parameter responsive to an inference or determination of the personal electronic device leaving a restricted access environment.

In step 604, storing or transmitting second data can include outputting data corresponding to the MIR data. For example, outputting the data can include outputting particular data corresponding to the MIR data from a particular personal electronic device to the particular personal electronic device. Alternatively, outputting the second data can include outputting the data corresponding to the MIR data to a console, to storage, or to a client or subscriber other than a particular personal electronic device corresponding to the MIR data.

According to embodiments, outputting second data corresponding to the MIR data in step 604 can include outputting a minimally processed representation of the MIR data. For example, a minimally processed representation of the MIR data can include an indication of object positions in a probed region, without further processing to determine a likely identity of the objects. Alternatively, outputting second data corresponding to the MIR data in step 604 can include outputting a processed representation of the MIR data. For example, the processed representation can include iconography corresponding to likely identities of objects. In another example, the processed representation can include superposition of detected objects over a map or plan view relative to the personal electronic device. In another example, outputting data corresponding to the MIR data can include outputting a representation of one or more network or personal electronic device parameters selected or changed responsive to MIR data.

Optionally some or all of the method 601 shown in FIG. 6 can be embodied as computer readable instructions carried by non-transient computer readable media. Thus, the computer readable instructions can cause one or more computers to perform some or all of the steps of the method 601.

Figure 7:
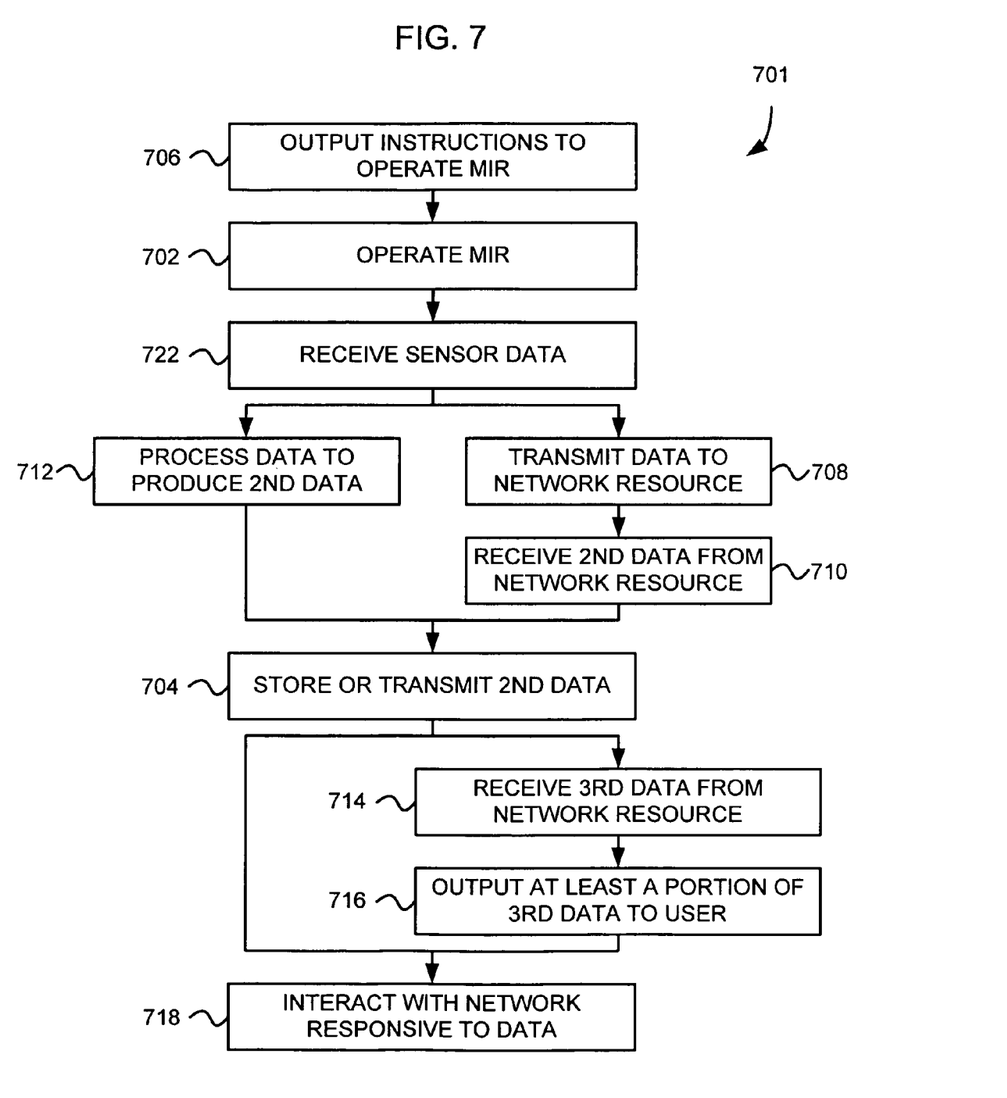
FIG. 7 is a flow chart showing a method for operating a MIR operatively coupled to a personal electronic device, and storing or transmitting second data corresponding to data from the MIR, according to an embodiment.

FIG. 7 is a flow chart showing a method 701 for operating a MIR in step 702 operatively coupled to a personal electronic device to produce MIR data and, in step 704, storing or transmitting second data corresponding to MIR data, according to an embodiment. According to embodiments, operating the MIR in step 702 and storing or transmitting the second data 704 can be performed by the personal electronic device. For example, the personal electronic device can include a cellular phone, a smart phone, a tablet computer, a pager, or a combination thereof.

The method 701 can include step 706 wherein instructions are output from the personal electronic device to operate the MIR. For embodiments where the MIR is integrated into the personal electronic device, such instructions may not necessarily be observable, but can include loading a data register, the expiration of a timer circuit, a looped program instruction, a one-shot or toggle of a control line, etc.

In some embodiments, it may be desirable for the MIR data to be processed by an external resource. In such cases, the method 701 can proceed, after operating the MIR to obtain MIR data in step 702, to step 708, wherein the MIR data is transmitted to a network resource. Subsequently, the process can proceed to step 710, wherein the second data is received from the network resource.

In other embodiments, it may be desirable for the MIR data to be processed by the personal electronic device. In such cases, the method 701 can proceed, after operating the MIR to obtain MIR data in step 702, to step 712, wherein the MIR data is processed by the personal electronic device to produce the second data.

In some embodiments, the second data can consist essentially of the MIR data. In other words, after signal processing the received probe pulses (see FIGS. 1 and 2 above for examples of such processing), the output can be stored or transmitted as second data in step 704. Alternatively, the second data can include a minimally processed representation of the MIR data, or the second data can include data extracted from the MIR data. Optionally, the second data can include a processed representation of the MIR data.

Optionally, the second data can include one or more network or personal electronic device parameters selected or changed responsive to the MIR data. For example, step 712 can include processing to determine if the MIR data includes information pre-determined to select an operation logic or mode by the personal electronic device. Alternatively, such processing can be performed by a remote resource as described above in conjunction with steps 708 and 710.

Optionally, after step 704, the process 701 can then proceed to step 718, wherein the personal electronic device interacts with a communication network in a manner responsive to the MIR data. In step 718, the personal electronic device can interact with the network in a manner responsive also to the second data.

Optionally, step 704 can include transmitting the second data across a communication network to a network resource. According to such embodiments (optionally, in combination with proceeding directly from step 704 to step 720), third data can be received from the network resource, and step 718 can alternatively or additionally include interacting with the network in a manner responsive to the MIR data and responsive to the third data. Optionally, transmitting the second data in step 704 can be performed responsive to a user command (not shown) or a user option. Additionally or alternatively, transmitting the second data in step 704 can be performed automatically.

Accordingly, the process 701 can include step 714, wherein third data is received from a network resource. Optionally, the process 701 can proceed to step 716 wherein at least a portion of the third data is output to a user. For example, at least a portion of the third data can be displayed to a user on a display of the personal electronic device.

The third data can include data selected responsive to the second data. For example, the third data can include a media file. Step 716 can include, for example, outputting at least a portion of the third data to a user in step 716 can include one or more of outputting an image, outputting a video, outputting audio information, outputting game information, outputting advertising content, and/or outputting haptic information.

Alternatively (as indicated above), the third data can include at least one parameter that is a function of the MIR data. For example, the third data can include one or more personal electronic device parameters selected to cause the personal electronic device to operate in a way that is responsive to the MIR data. The process 701 can thus proceed to step 718 wherein the personal electronic device interacts with the network in a manner responsive to the MIR data. Interacting with the network in a manner responsive to the MIR data in step 718 can include, for example, interacting according to a network call admission parameter as a function of a number, proportion, projected number, or projected proportion of a plurality of personal electronic devices assigned a restricted network access parameter. For example, the call admission parameter can correspond to a shorter call acceptance time responsive to the MIR data being predictive of at least a portion of personal electronic devices not being granted network access. Such a network call admission parameter can be selected to span the network or can be selected to span a cell or a beamformed subset of a cell.

Additionally or alternatively, interacting with the network in a manner responsive to the MIR data in step 718 can include receiving a reduced call acceptance time responsive to a personal electronic device environment corresponding to a likelihood of a call being made. For example, a personal electronic device environment corresponding to a likelihood of a call being made can include a detected user approaching the personal electronic device or reaching for the personal electronic device. In another example, the personal electronic device environment corresponding to a likelihood of a call being made can include the particular personal electronic device not being in a detected restricted network access environment.

Alternatively, interacting with the network in a manner responsive the MIR radar data can include receiving a bandwidth allocation.

Additionally or alternatively, as described above in conjunction with FIG. 4, the personal electronic device can include or be operatively coupled to one or more sensors other than the MIR. This or these can be referred to as a second sensor. The process 701 can include step 722 wherein the personal electronic device receives sensor data. The second second data stored or transmitted in step 704 can also or alternatively correspond to the sensor data. For example, the second sensor(s) can include, for at least a subset of the one or more personal electronic devices, one or more of a microphone, a camera, a motion sensor, an accelerometer, a magnetic field sensor, an electronic compass, a gyroscope, a gravitational field sensor, a global positioning system receiver, a capacitive sensor, a microswitch, a light sensor, an infrared sensor, a radio frequency sensor, a microwave sensor, a millimeter wave sensor, and/or a vibration sensor. Optionally, each type of sensor can be present in numbers greater than one.

Optionally, some or all of the method 701 shown in FIG. 7 can be embodied as computer readable instructions carried by non-transient computer readable media. Thus, the computer readable instructions can cause one or more computers to perform the steps.

While particular aspects of the present subject matter described herein have been shown and described, it will be apparent that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A system, comprising:
a network resource configured to receive micro-impulse radar data from one or more personal electronic devices; and
a communications circuit configured to operatively couple one or more personal electronic devices to the network resource, each personal electronic device being operatively coupled to and configured to operate at least one micro-impulse radar and to receive the micro-impulse data from the micro-impulse radar, and each personal electronic device being configured to transmit the micro-impulse radar data to the network resource;
wherein the network resource includes logic circuitry configured to perform one or more logical operations on the transmitted micro-impulse radar data to produce at least one parameter that is a function of the micro-impulse radar data, the at least one parameter including at least one personal electronic device parameter.

2. The system of claim 1, wherein at least a portion of the one or more personal electronic devices include at least one component of a monostatic micro-impulse radar.

3. The system of claim 1, wherein at least a portion of the one or more personal electronic devices include at least one component of a bistatic micro-impulse radar.

4. The system of claim 1, wherein the logic circuitry is configured to select one or more operating parameters of each portable electronic device responsive to the micro-impulse radar data.

5. The system of claim 4, wherein the network resource is further configured to transmit the one or more operating parameters to each portable electronic device.

6. The system of claim 1, wherein the logic circuitry is configured to compare the micro-impulse radar data to one or more criteria, and output data or select operating parameters responsive to the comparison.

7. The system of claim 6, wherein the one or more criteria include one or more of range, strength-of-response, direction, spectral characteristics, polarization, or Doppler characteristics.

8. The system of claim 1, wherein the logic circuitry is configured to determine or infer, from the micro-impulse radar data, an environment of the personal electronic device.

9. The system of claim 1, wherein the at least one parameter includes at least one network parameter.

10. The system of claim 9, wherein the at least one network parameter includes at least one network access parameter.

11. The system of claim 9, wherein the network parameter includes a network switching parameter.

12. The system of claim 9, wherein the network parameter includes a network forwarding parameter.

13. A method, comprising:
operating a micro-impulse radar from one or more personal electronic devices coupled thereto and receiving micro-impulse radar data at the one or more personal electronic devices from the micro-impulse radar;
receiving the micro-impulse radar data at a network resource from the one or more personal electronic devices operatively coupled to the network resource across a communication network;
producing a second data at the network resource, the second data including at least one parameter that is a function of the received micro-impulse radar data, the at least one parameter including at least one personal electronic device parameter; and
storing the second data on the network resource or transmitting the second data from the network resource.

14. The method of claim 13, further comprising:
selecting one or more operating parameters for the one or more portable electronic devices responsive to the micro-impulse radar data.

15. The method of claim 13, further comprising:
comparing the micro-impulse radar data to one or more criteria; and
wherein the second data includes one or more operating parameters selected responsive to the comparison.

16. The method of claim 15, wherein the one or more criteria include one or more of range, strength-of-response, direction, spectral characteristics, polarization, or Doppler characteristics.

17. The method of claim 13, further comprising:
determining or inferring, from the micro-impulse radar data, an environment of a particular personal electronic device of the one or more personal electronic devices.

18. The method of claim 13, wherein the second data includes at least one network parameter, and further comprising:
determining the at least one network parameter responsive to the micro-impulse radar data analysis.

19. The method of claim 18, wherein the at least one network parameter includes at least one network access parameter.

20. The method of claim 18, wherein the at least one network parameter includes an individual call admission parameter corresponding to a pre-admission function selected for a particular personal electronic device to reduce call acceptance time responsive to a particular personal electronic device environment corresponding to a likelihood of a call being made.

21. The method of claim 18, wherein the at least one network parameter includes a network switching parameter.

22. The method of claim 18, wherein the at least one network parameter includes a network forwarding parameter.

23. A non-transitory computer-readable medium carrying computer instructions configured to cause a network resource to execute steps comprising:
  operating a micro-impulse radar from one or more personal electronic devices coupled thereto and receiving micro-impulse radar data at the one or more personal electronic devices from the micro-impulse radar;
  receiving the micro-impulse radar data from one or more personal electronic devices;
  producing a second data at the network resource, the second data including at least one parameter that is a function of the received micro-impulse radar data, the at least one parameter including at least one personal electronic device parameter; and
  storing the second data on the network resource or transmitting the second data from the network resource.

24. The non-transitory computer-readable medium carrying computer instructions of claim 23, wherein the steps further comprise:
  comparing the micro-impulse radar data to one or more criteria; and
  wherein the second data includes one or more operating parameters selected responsive to the comparison.

25. The non-transitory computer-readable medium carrying computer instructions of claim 24, wherein the one or more criteria include one or more of range, strength-of-response, direction, spectral characteristics, polarization, or Doppler characteristics.

26. The non-transitory computer-readable medium carrying computer instructions of claim 23, wherein the steps further comprise:
  determining or inferring, from the micro-impulse radar data, an environment of a particular personal electronic device.

27. The non-transitory computer-readable medium carrying computer instructions of claim 23, wherein the second data includes at least one network parameter, and wherein the steps further comprise:
  determining the at least one network parameter responsive to the micro-impulse radar data analysis.

28. The non-transitory computer-readable medium carrying computer instructions of claim 23, wherein the steps further comprise:
  receiving a third data from the network resource.

29. The non-transitory computer-readable medium carrying computer instructions of claim 28, wherein the third data includes a processed representation of the micro-impulse radar data, and wherein the steps further comprise:
  displaying at least a portion of the third data on a display of the personal electronic device.

30. A method, comprising:
  from a personal electronic device, operating a micro-impulse radar operatively coupled to the personal electronic device to produce micro-impulse radar data;
  from the micro-impulse radar, receiving micro-impulse radar data at the personal electronic device;
  sending from the personal electronic device the micro-impulse radar data to a network resource;
  producing a second data at the network resource, the second data including at least one parameter that is a function of the received micro-impulse radar data, the at least one parameter including at least one personal electronic device parameter;
  storing the second data on the network resource or transmitting the second data from the network resource.

31. The method of claim 30, further comprising:
  outputting instructions to operate the micro-impulse radar from the personal electronic device.

32. The method of claim 30, wherein operating the micro-impulse radar is performed by the personal electronic device.

33. The method of claim 30, further comprising:
  receiving the second data transmitted from the network resource at the personal electronic device.

34. The method of claim 30, further comprising:
  receiving a third data from the network resource.

35. The method of claim 34, wherein the third data includes a processed representation of the micro-impulse radar data, and further comprising:
  displaying at least a portion of the third data on a display of the personal electronic device.

36. The method of claim 34, wherein the third data includes data selected responsive to the second data.

* * * * *